Patented Apr. 22, 1924.

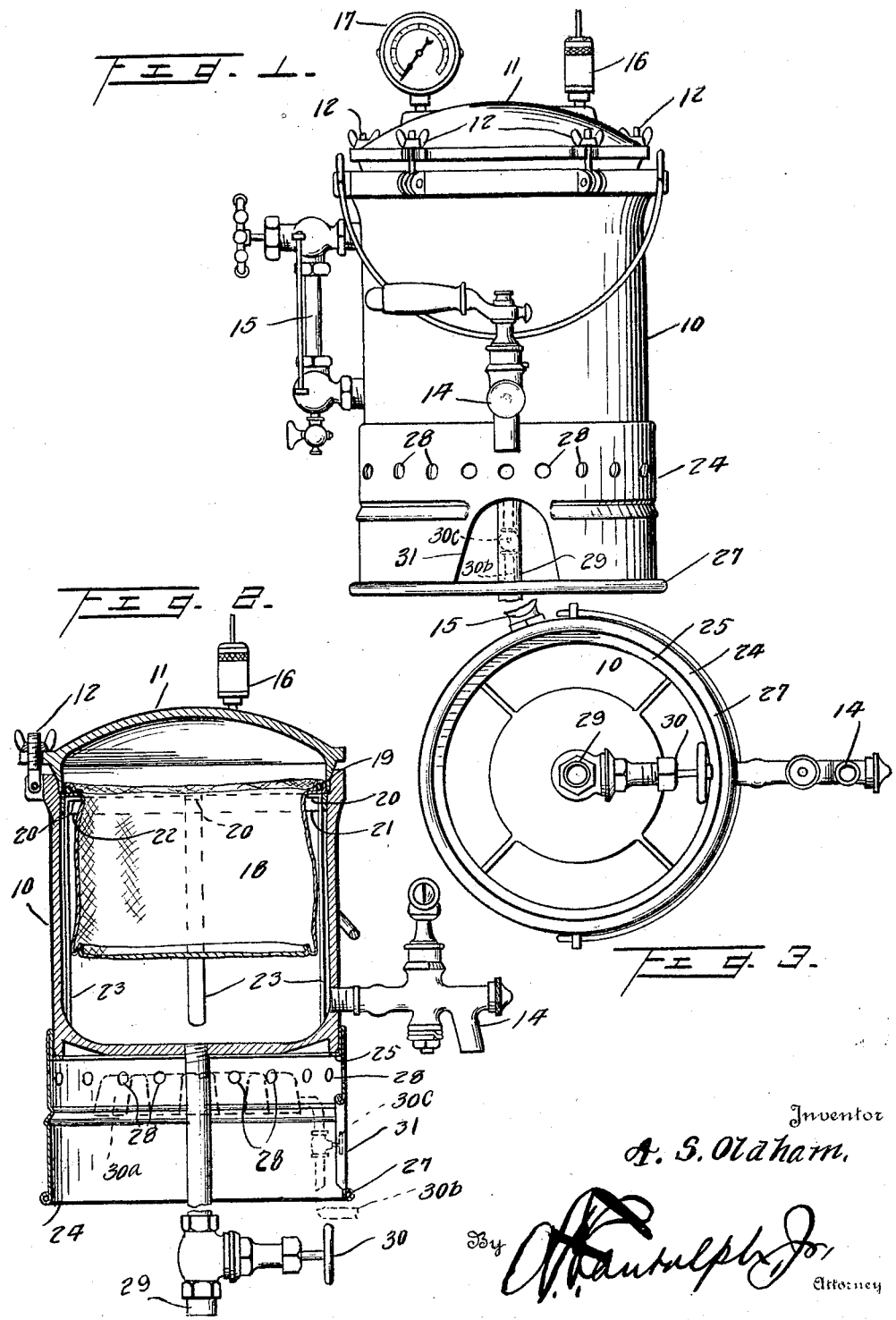

1,491,730

UNITED STATES PATENT OFFICE.

ARTHUR S. OLDHAM, OF MIAMI, OKLAHOMA.

APPARATUS FOR MAKING COFFEE.

Application filed July 3, 1923. Serial No. 649,311.

*To all whom it may concern:*

Be it known that I, ARTHUR S. OLDHAM, a citizen of the United States, residing at Miami, in the county of Ottawa and State of Oklahoma, have invented certain new and useful Improvements in Apparatus for Making Coffee; and I do hereby declare the following to be a full, clear, and exact description of the invention, such as will enable others skilled in the art to which it appertains to make and use the same.

This invention relates to an apparatus for making coffee and constitutes a continuation in part of my application Serial No. 586,682, filed September 7th, 1922, Patent 1,478,908, Dec. 25, 1923, for an improved method of making coffee and otherwise forms an improvement over the structure disclosed in that application.

The present invention aims to provide a novel apparatus wherein the process of the aforesaid application may be practiced efficiently and economically, one whose parts are readily accessible and unobstructed for cleaning and one having a novel supporting base.

Various minor objects and advantages will become apparent from a consideration of the description following taken in connection with accompanying drawings illustrating an operative embodiment.

In said drawings:—

Figure 1 is a view of the apparatus in side elevation,

Figure 2 is a vertical sectional view of the value extracting or pressure vessel and its outlet, and Figure 3 is an inverted plan view of the value extracting or pressure vessel.

The apparatus embodies essentially a preferably portable value-extracting or cooking vessel or retort 10 having a top or cover 11 which may be secured in place by pivoted clamps 12 or the equivalent thereof and which vessel is constructed to withstand a super-atmospheric internal pressure and provided with a valved distributing faucet 14 whereby the liquid contents may be withdrawn from time to time for supply to the consumers.

The vessel 10 is provided with a coffee gage 15, a pressure-relief or safety valve 16 and a pressure gage 17.

In the vessel 10, a cloth or foraminous sack 18 is arranged to contain the coffee during the process of extracting the values thereof. Sack 18 is removably supported in vessel 10 by a ring or hoop 19 carried by the sack and resting on lugs 20 of a removable frame 21 completed by a ring 22 and legs 23 of which said lugs 20 are inwardly bent terminals.

A suitable supporting base 24 is provided which may essentially be a sheet of copper having its upper portion extended inwardly and downwardly to surround vessel 10 to form a supporting wall 25 since it has a ledge or flange 25 integral with it. Base 24 has a reinforcing head 27 and vent openings 28.

A drain pipe 29 depends from the bottom of vessel 10 and has a cut-off valve 30. As shown by dotted lines in Figure 2, a circular gas burner $30^a$ is employed as the heating agent. This burner is provided with a central opening through which the drain pipe 29 extends, and is, as shown, arranged within the base 24. A supply pipe 33 is provided for the burner, and it is equipped with a valve $30^c$ which is accessible through an opening 31 in the base.

The coffee either in the whole bean or ground form, when faucet 14 and valve 30 are closed, is placed in the sack in the vessel 10 in a definite proportion as for example, five ounces of the former to the gallon of the latter. Then the cover of the vessel is tightly secured in place to prevent loss of pressure and heat is applied in any suitable way as to the bottom of vessel 10 to raise the temperature of the liquid contents of the vessel 10 and at the same time the pressure to a super-atmospheric degree, as for example until the pressure gage indicates 15 pounds or the equivalent of two atmospheres. In this condition the contents of the vessel are maintained for a period of from fifteen to twenty minutes, after which the liquid may be withdrawn cupful by cupful or entirely into another vessel through the faucet 14. Vessel 10 may then be recharged for a further extraction of values from a new charge of coffee to be again deposited with the requisite water in the dispensing vessel, so that, when for example the apparatus is used in a hotel or restaurant, the dispensing vessel may be continuously supplied with freshly prepared coffee for service to the consumers or customers.

It is particularly to be emphasized that the frame 21 and sack 18 are completely removable so that the vessel 10 may be cleaned without interference by any obstruction therein and the cleaning is facilitated by the provision of drain pipe 29 and valve 30.

Changes in the details may be resorted to provided they fall within the spirit and scope of the invention.

What I claim as my invention:

1. A coffee making and dispensing apparatus having a vessel, a sack for coffee removably disposed in said vessel, a support within the vessel for the sack, said support consisting of a ring, legs depending from the ring, said legs at their upper terminals being deflected inwardly to directly support said sack, and a ring carried by said sack about its opening for support on said terminals.

2. A coffee making and dispensing apparatus having a vessel in which coffee is adapted to be made, an upstanding base for said vessel, said base having a wall integral therewith extending downwardly and inwardly and surrounding the vessel, said wall at its free edge being extended inwardly to form a supporting ledge for the vessel, a drain pipe leading from the vessel and surrounded by said base, a valve in said drain pipe, said base having an opening to permit access to said valve, a sack for coffee removably disposed in said vessel, and a removable support in said vessel for said sack.

In testimony whereof I affix my signature in presence of three witnesses.

ARTHUR S. OLDHAM.

Witnesses:
G. W. GRANT,
IONE WEBSTER,
DOVIE STEELMAN.